United States Patent
Johansson (10) Patent No.: US 9,740,686 B2
(45) Date of Patent: Aug. 22, 2017

(54) SYSTEM AND METHOD FOR REAL-TIME MULTIMEDIA REPORTING

(71) Applicant: StenoTran Services, Inc., Ottawa (CA)

(72) Inventor: Lynda Ruth Johansson, Ottawa (CA)

(73) Assignee: STENOTRAN SERVICES INC., Ottawa (CA)

(*) Notice: Subject to any disclaimer, the term of this patent is extended or adjusted under 35 U.S.C. 154(b) by 89 days.

(21) Appl. No.: 13/768,559

(22) Filed: Feb. 15, 2013

(65) Prior Publication Data
US 2014/0180667 A1    Jun. 26, 2014

(30) Foreign Application Priority Data
Dec. 20, 2012    (CA) .................................... 2799892

(51) Int. Cl.
G06F 17/28    (2006.01)
G10L 15/32    (2013.01)

(52) U.S. Cl.
CPC ............ *G06F 17/28* (2013.01); *G06F 17/289* (2013.01); *G10L 15/32* (2013.01)

(58) Field of Classification Search
CPC ........................................................ G06F 17/28
USPC ............................................................. 704/2
See application file for complete search history.

(56) References Cited

U.S. PATENT DOCUMENTS

| | | | |
|---|---|---|---|
| 6,385,586 B1 | 5/2002 | Dietz | |
| 6,628,767 B1* | 9/2003 | Wellner | H04M 3/42161 379/202.01 |
| 6,816,468 B1 | 11/2004 | Cruickshank | |
| 7,412,378 B2* | 8/2008 | Lewis | G10L 21/04 704/211 |
| 2011/0246172 A1* | 10/2011 | Liberman | H04N 7/152 704/2 |
| 2011/0271210 A1* | 11/2011 | Jones | H04L 12/1827 715/753 |
| 2012/0016671 A1* | 1/2012 | Jaggi | G10L 15/22 704/235 |
| 2012/0029918 A1* | 2/2012 | Bachtiger | 704/235 |
| 2014/0163982 A1* | 6/2014 | Daborn | G10L 15/26 704/235 |

* cited by examiner

*Primary Examiner* — David Hudspeth
*Assistant Examiner* — Shreyans Patel
(74) *Attorney, Agent, or Firm* — Daniel J. Chalker; Edwin S. Flores; Chalker Flores, LLP (57) ABSTRACT

The present invention provides a real-time multimedia event reporting system and method that enable reporters to generate accurate reports or contents simultaneously in multiple languages accessible by users from anywhere in any form in real-time as the live event proceeds. In addition, the present invention enables the generation of a multi-language report in which words uttered during the event are represented in the languages that they were spoken. The disclosed system also enhances the real-time performance of the reporting process by enabling dynamic adjustment to the speech transcription operating parameters and by providing real-time editing of transcribed text using configurable event-specific text representations.

4 Claims, 5 Drawing Sheets

SYSTEM AND METHOD FOR REAL-TIME MULTIMEDIA REPORTING

FIELD OF THE INVENTION

The present invention relates generally to multimedia event reporting, and particularly to system and method for reporting multimedia event in real-time.

CROSS REFERENCE TO RELATED APPLICATIONS

This patent application is a non-provisional patent application of Canadian patent application 2,799,892 filed on Dec. 20, 2012 and entitled "System and Method for Real-Time Multimedia Reporting", which is hereby incorporated by reference in its entirety.

BACKGROUND OF THE INVENTION

Various systems and methods for reporting multimedia events have been known. For example, in the context of conventional court proceedings reporting, a court reporter uses a stenotype machine to document all spoken words as written transcript. While stenotype machines allow multiple keys to be pressed simultaneously in a single hand motion to record combination of letters representing syllables, words, or phrases, they can be tedious to use or difficult to master. Consequently, fewer and fewer qualified stenographers who can report with fast speed while maintaining high accuracy are available. Therefore, this method may not be suitable for event reporting in real-time.

Some reporting systems use voice recognition technology. Such systems typically have a recorder for collecting speech audio and generating a digitized audio file, and a speech recognition engine for transcribing the digital audio file into text. However, the accuracy of the text transcribed by the existing systems in the art is usually low so that human review or modification is often necessary to produce the text report with acceptable accuracy.

For example, speech recognition may not work well on speeches from the original speakers in an event due to a number of factors including imperfection of speakers' pronunciation, speakers' accent, their distance from the recorder, and the lack of training to properly use a speech recognition product. As such, the automatically generated reporting based on the original speeches will require further editing by a reporter at a much later time, often requiring concurrent playback of the recorded audio file to ensure accuracy.

In some reporting, a reporter is on site at the event and repeats verbatim the speaker's utterance into a recorder coupled to a speech recognition device. Such reporter is usually equipped with customized dictionaries containing context-dependent words or terminology to work more efficiently in specific types of reporting. However, the transcription accuracy of this method remains unsatisfactory, and subsequent editing is usually required to produce the report. Furthermore, the current automatic speech recognition technology generally does not allow real-time and flexible work flow and as a result has limitations in providing accurate real-time transcription, and cannot be easily adapted to meet the requirements for multimedia reporting in multiple languages.

U.S. Pat. No. 6,816,468 discloses a teleconferencing system for providing transcription and translation service during a teleconference. However, the disclosed system uses conventional speech recognition software, which cannot provide accurate transcription as official written report. Further, the machine translation is performed on the transcribed text and thus may further reduce the accuracy of the output text to user.

U.S. Pat. No. 6,385,586 discloses a language capture device that allows for translation into another language. This device converts the captured utterance into text, but requires a manual verification of the correctness of the text before performing the translation. If the converted text is incorrect, the speech needs to be repeated. As such, the disclosed device does not provide accurate and real-time conversion from speech to text and is not suitable for producing official reports in real-time.

Therefore, there remains a need for an improved system and method for multimedia event reporting with enhanced accuracy while meeting the requirements for reporting in real-time.

SUMMARY OF THE INVENTION

The present invention overcomes the shortcomings of the prior art by providing improvements to the existing reporting system and the work flow or process of event reporting. The present invention provides reporting system and method that enable event reporters to generate nearly instantaneous, accurate multimedia reporting or contents, and allows the real-time streaming of the generated contents to end users, so that the users can access from anywhere well formatted high quality reporting in real-time as the live event proceeds.

The present invention further advantageously provides real-time, accurate reporting simultaneously in multiple reporting languages. In addition, the present invention provides a real-time, accurate reporting in multiple languages such that a single multi-language reporting includes the original words uttered during the event in the languages that they were spoken.

In accordance with one aspect of the present invention, there is provided a method for reporting audio in a plurality of languages, comprising the steps of: (a) receiving a sequence of audio; (b) substantially simultaneous with receiving the sequence of audio, generating a corresponding audio stream in each of the plurality of languages; and (c) converting each of the generated audio stream into a text stream in respective language.

In accordance with another aspect of the present invention, there is provided a method for reporting audio in a plurality of languages, comprising the steps of: (a) receiving a sequence of audio; (b) substantially simultaneous with receiving said sequence of audio, generating a corresponding audio stream in each of said plurality of languages; (c) converting each of said generated audio stream into a text stream in respective language; and (d) substantially simultaneous with converting said generated audio streams, selectively combining said converted text streams into a combined multi-language text stream representing said sequence of audio in said plurality of languages.

In accordance with another aspect of the present invention, there is provided a system for reporting a sequence of audio in a plurality of languages, the system comprising: means for simultaneously generating, in each of said plurality of languages, an audio stream corresponding to said sequence of audio; a converter for converting each of said generated audio stream into a text stream in respective language; and a combiner for selectively combining said converted text streams into a combined multi-language text stream representing said sequence of audio in said plurality of languages.

In accordance with another aspect of the present invention, there is provided a computer readable memory having recorded thereon statements and instructions for execution by a computer for reporting a sequence of audio in a plurality of languages, said statements and instructions comprising: means for simultaneously generating, in each of said plurality of languages, an audio stream corresponding to said sequence of audio; means for converting each of said generated audio stream into a text stream; and means for selectively combining said converted text streams into a combined multi-language text stream representing said sequence of audio in said plurality of languages.

In accordance with another aspect of the present invention, there is provided a method of transcribing audio into text using a speech recognition system, comprising the steps of: (a) monitoring an input speed of a sequence of audio for transcription, at least one operating parameter of said speech recognition system, and an output speed of a transcribed text, said at least one operating parameter affecting said output speed of said transcribed text; and (b) adjusting said at least one operating parameter of said speech recognition system so that said transcribed text is synchronized with said sequence of audio within a threshold delay defined in number of seconds or number of words.

In accordance with another aspect of the present invention, there is provided a method of incorporating source information about a sequence of audio into a text transcribed therefrom, the method comprising the steps of: (a) storing a location representation of a source of said sequence of audio and an identity representation of said source in non-transitory computer accessible storage medium; (b) associating said location representation with said identity representation; and (c) upon detecting said audio from said source, accessing said location representation of said source thereby causing a processor to incorporate at least a portion of said associated identity representation of said source into said transcribed text.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

The present invention provides systems and methods for reporting a multimedia event in a plurality of reporting languages, with enhanced accuracy and real-time capability.

Figure 1:
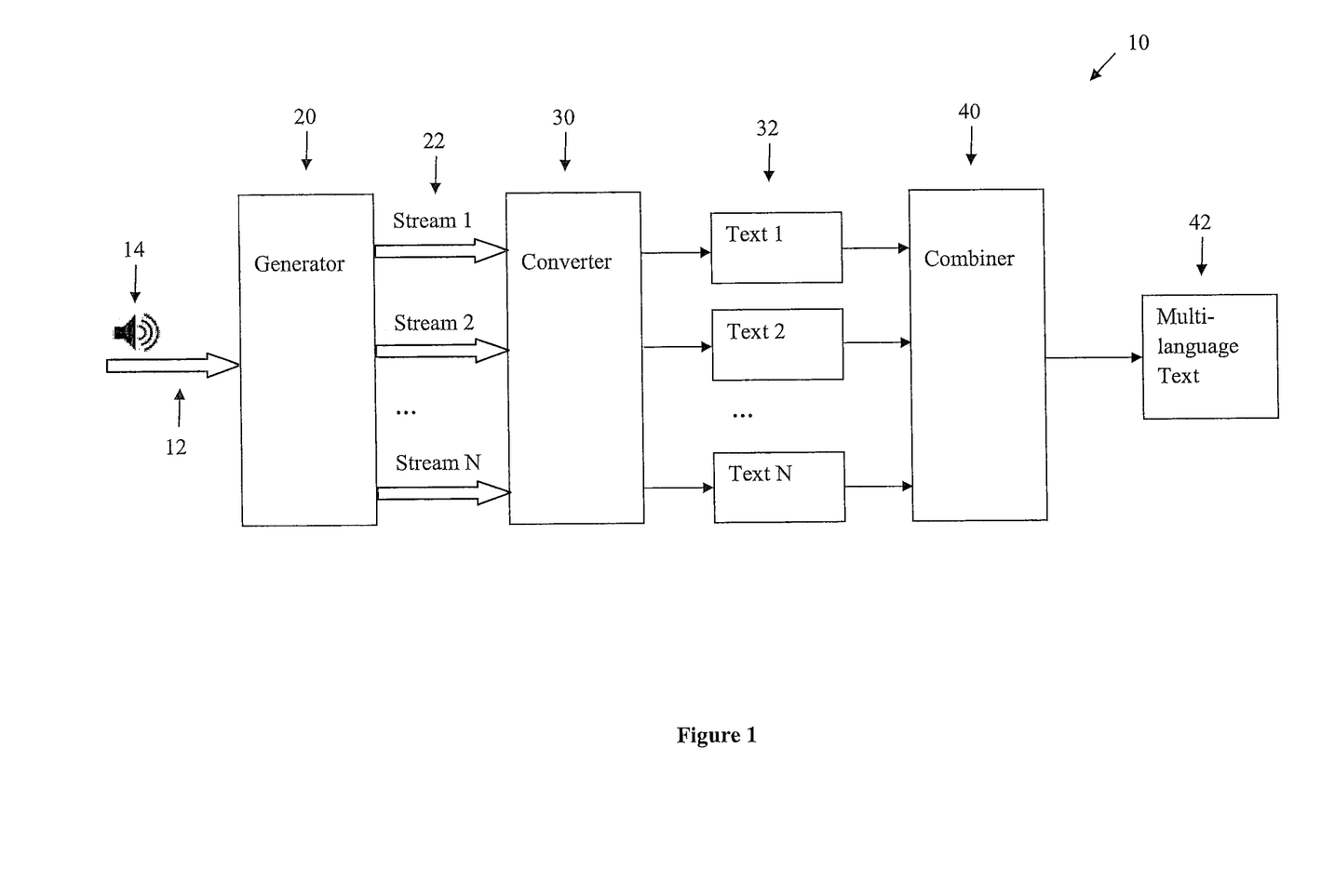
FIG. 1 is a schematic diagram of an example embodiment of the system in accordance with the present disclosure.

Referring to FIG. 1, there is shown an example embodiment of a system in accordance with the present disclosure, for reporting multimedia signals including audio, combination of audio and video and/or text. While the systems and methods described hereinafter may refer to a specific media type for illustration purpose only, it is to be noted that the same general principles disclosed herein are equally applicable to other media types or a mixture of media types.

Using audio as an example, the system 10 receives as input a sequence of audio 12, which includes audio segments in one or more languages, and produces one or more text streams 32 that corresponds to the input audio 12. The audio sequence 12 is usually associated with at least one audio source 14, for example, one or more speakers of an event of interest. A person skilled in the art would appreciate that audio source 14 is not limited to live speech and may also encompass pre-recorded or stored audio for an event, or any audio content that is subject to reporting.

The system 10 is configurable to produce, in each of the reporting languages, a text stream 32 that corresponds to audio 12. In addition, the system 10 is configurable to produce a multi-language text stream 42 that corresponds to audio 12. In this regard, the input audio 12 may have been pre-processed to only include utterance in some or all of the reporting languages. For example, if a speaker of an event uses a language other than the reporting languages, the speech can be translated into a pre-selected reporting language by a translator or by a speech-to-speech translation system.

In the example embodiment shown in FIG. 1, there are N different reporting languages. Accordingly, the system 10 will generate N text streams 32, one in each of the N languages, and each corresponding with the content of input audio 12, translated if need be. Based on the N text streams 32, the system 10 may further generate a single multi-language text stream 42 that corresponds to audio 12. To illustrate, in a court proceeding to be reported in two official languages, e.g. English and French, witnesses testimonies may be given in one or both of the official languages, or in languages other than the official languages. In the latter case, translation into official languages will be required to produce court reporting in official languages. For all speeches of the proceeding or any portion thereof, original or translated, system 10 is configurable to simultaneously generate a text stream or script in English, a text stream or script in French, and where applicable (e.g. bilingual proceeding), a text stream mixed with English and French wherein the spoken words are represented using the actual languages that were spoken.

In an example embodiment, the system 10 comprises a generator means 20 for simultaneously generating, using each of the reporting languages, an audio stream 22 corresponding to the input audio 12; and a converter 30 for converting each of the generated audio stream 22 into a text stream 32 in the respective language.

In some embodiments, the generator 20 is implemented by one or more reporters using voice writing apparatus for reporting a multimedia event. Namely, each reporter repeats a sequence of speech spoken during at least a portion of the event directly into a voice recorder, which is usually equipped with a mouth mask for preventing the reporter from being heard. All reporters speak substantially simultaneously for the duration of the speech and each reporter speaks in one of the reporting languages for the event. As such, an audio stream 22 corresponding to the input audio 12 is generated for each of the languages used for reporting the input audio 12. Moreover, as with input audio 12, the generated audio streams 22 can be stored and/or further processed in any suitable manners known to a person skilled in the art.

The converter 30 converts at least a portion of each of the generated audio stream 22 into a text stream 32 in its respective language. In an example embodiment, the converter 30 comprises means for transcribing speech into text. For example, a speech recognition system can be used as converter 30. In some embodiments, audio streams 22 can be stored and played back for transcription by stenographers using stenotype machines.

Preferably, the converter 30 coverts each of the generated audio stream 22 in entirety into a text stream 32 in its respective language, so that a complete event transcript 32 is created in each reporting language.

Preferably, the converted text streams 32 are stored in a machine-readable storage medium and/or further processed for use by the reporters, end users, or any interested parties.

According to an example embodiment, the system 10 further comprises a combiner 40 for selectively combining the converted text streams 32 into a combined multi-language text stream 42 representing the sequence of audio 12 in a plurality of reporting languages.

Preferably, the combiner 40 selects blocks of text from the text streams 32 according to the corresponding order in the audio input 12. Namely, the order of text blocks in streams 32 and 42 matches the order of corresponding audio segments in audio input 12.

Preferably, the combiner 40 combines the text streams 32 substantially in real-time or concurrent with the generation of the text streams 32.

In some example embodiments, information associated with the segments, portions or blocks of input audio 12, and/or generated audio streams 22 and/or transcribed text streams 32, including timing information and the languages of audio 12, and/or generated audio streams 22 and/or transcribed text streams 32, is stored in computer-readable non-transitory memory accessible to the system 10 and/or to the combiner 40, thereby enables the combiner 40 to simultaneously generate the combined multi-language text stream 42 in real-time. In some embodiments, the converter 30 may supply at least some of the above information to the combiner 40.

It is also possible for the combiner 40 to select blocks of text from the text streams 32 according to other user defined selection criteria. For example, in some situations, it may be desirable to produce a portion of the transcript 42 for audio 12 in one language, even though that portion in the original audio 12 may be multilingual. As another example, the selection criteria can be defined to exclude certain text blocks.

Preferably, the combined text stream 42 is stored in a machine-readable storage medium and/or further processed for use by the reporters, end users, or any interested parties.

Figure 2:
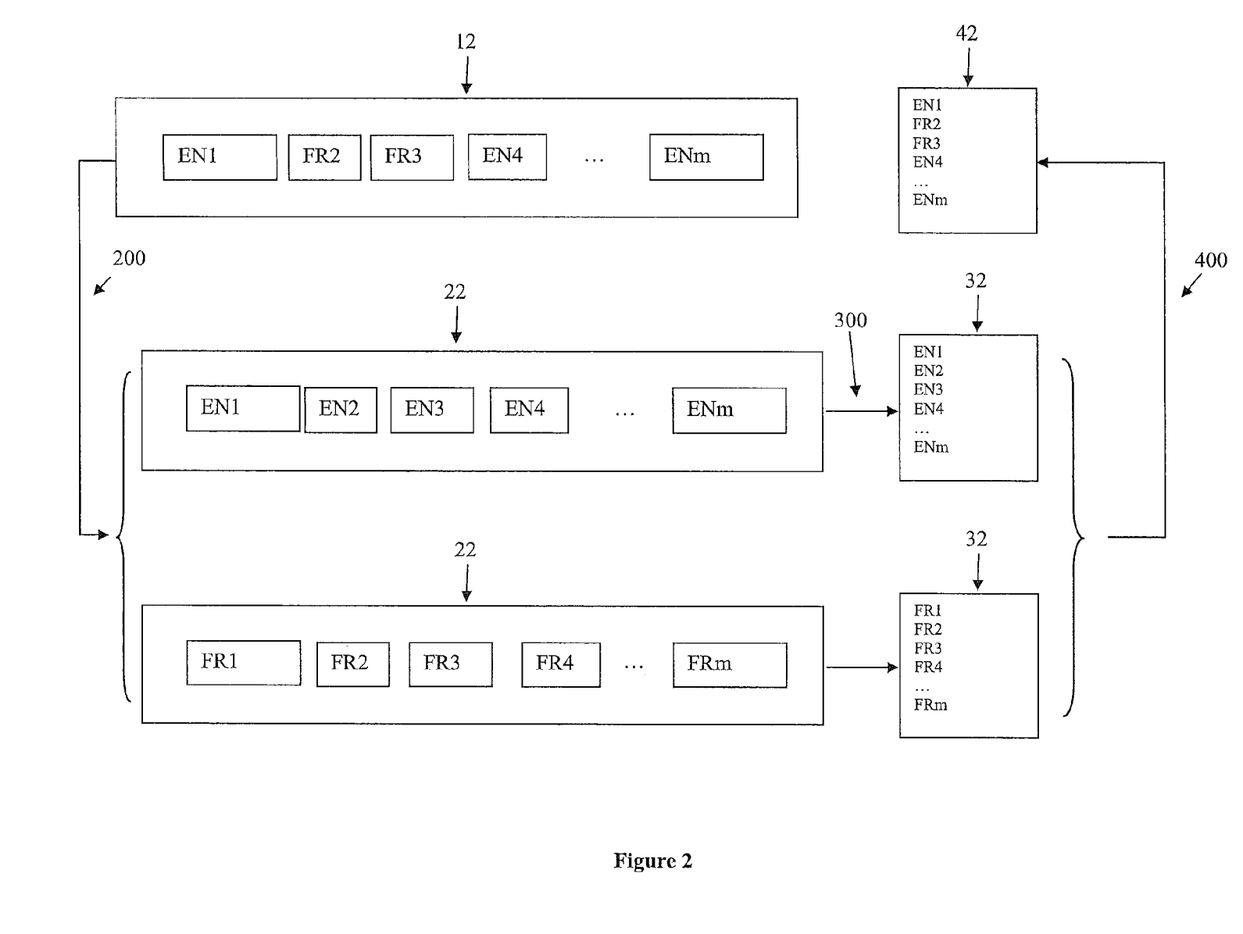
FIG. 2 is a schematic diagram of an example media path in accordance with the present disclosure.

The above described process and system 10 can be illustrated in more detail with reference to FIG. 2. In this example, an input audio 12 comprises a sequence of m audio segments in two languages English and French. The audio segments are labeled by the languages spoken and the sequence numbers. As shown in FIG. 2, the input audio 12 contains a first English segment EN1, a second French segment FR2, a third French segment FR3, a forth English segment EN4, and so on so forth, with the last segment being an English segment ENm.

As there are two reporting languages, the system 10 generates, at step 200, an English audio stream 22 and a French audio stream 22, each corresponding to the input audio 12. In the English audio stream 22, the m audio segments EN1-ENm are all in English but maintain their order as in audio 12. Similarly, in the French audio stream 22, the m audio segments FR1-FRm are all in French but maintain their order as in audio 12.

Preferably, the generation of the English and French audio stream 22 is substantially concurrent with the receiving of audio 12 by the system 10. Preferably, system 10 simultaneously generates the two audio streams 22.

At step 300, the system 10 transcribes the English audio stream 22 into an English text stream 32, and transcribes the French audio stream 22 into a French text stream 32. Preferably, the transcriptions of the two audio streams 22 occur substantially simultaneously.

As the input audio 12 is bilingual in this example, the system 10 selectively combines the English text stream 32 and the French text stream 32 to generate a bilingual text stream 42 representing the input audio 12 in English and French, at step 400. In other words, text stream 42 contains text blocks selected from the two transcribed unilingual text streams 32 and arrange them in such a way that the text blocks in the bilingual text stream 42 correspond to the audio segments in the bilingual audio 12. In the example shown in FIG. 2, the text stream 42 comprises a first English text block EN1, a second French text block FR2, a third French text block FR3, a forth English text block EN4, and so on so forth, with the last segment being an English text block ENm.

The above process works for any number of reporting languages. When the input audio 12 is given in only one language, the system will still generate an audio stream 22 for each reporting language, and generates a text stream 32 for each audio stream 22, but need not generate the additional mixed-language text stream 42.

Advantageously, the system and method disclosed herein enable simultaneous generation of written transcripts of multimedia events using multiple reporting languages so that transcripts in different languages are simultaneously available to users with different native languages. In contrast, using the prior art systems, usually official reporting in only one language is available following a live event, and users in other language zones may have to wait for the official transcript to be translated into the users' respective native languages, which may take substantially long time.

Another advantage of the present invention is the generation of a multi-language text stream, also refer to herein as "floor transcription", which represents the words spoken on the "floor" of the event in the language the words were actually spoken. This will provide multilingual users with a transcript that more accurately reflects the speech portion of the event by preserving the nuances in the context of the original utterance. This feature enables reporting multilingual events or proceedings in its original, authentic language format.

The system 10 therefore provides multiple, simultaneous language-associated streams 32, 42 ready to be accessed and/or streamed to user devices such as iPad™, Android™ based devices or any user device of choice.

It should be noted that any separation between the components of system 10 is logical or functional as opposed to physical. In other words, the generator 20, converter 30, combiner 40 and any other components of system 10 can be implemented as separate units or as an one or more integrated units, and can be configured to connect, interconnect, or otherwise cooperate with others locally or remotely through communication links or networks known in the art.

The systems and methods described in the present disclosure can be enhanced with improved transcription accuracy and real-time capability.

Figure 3:
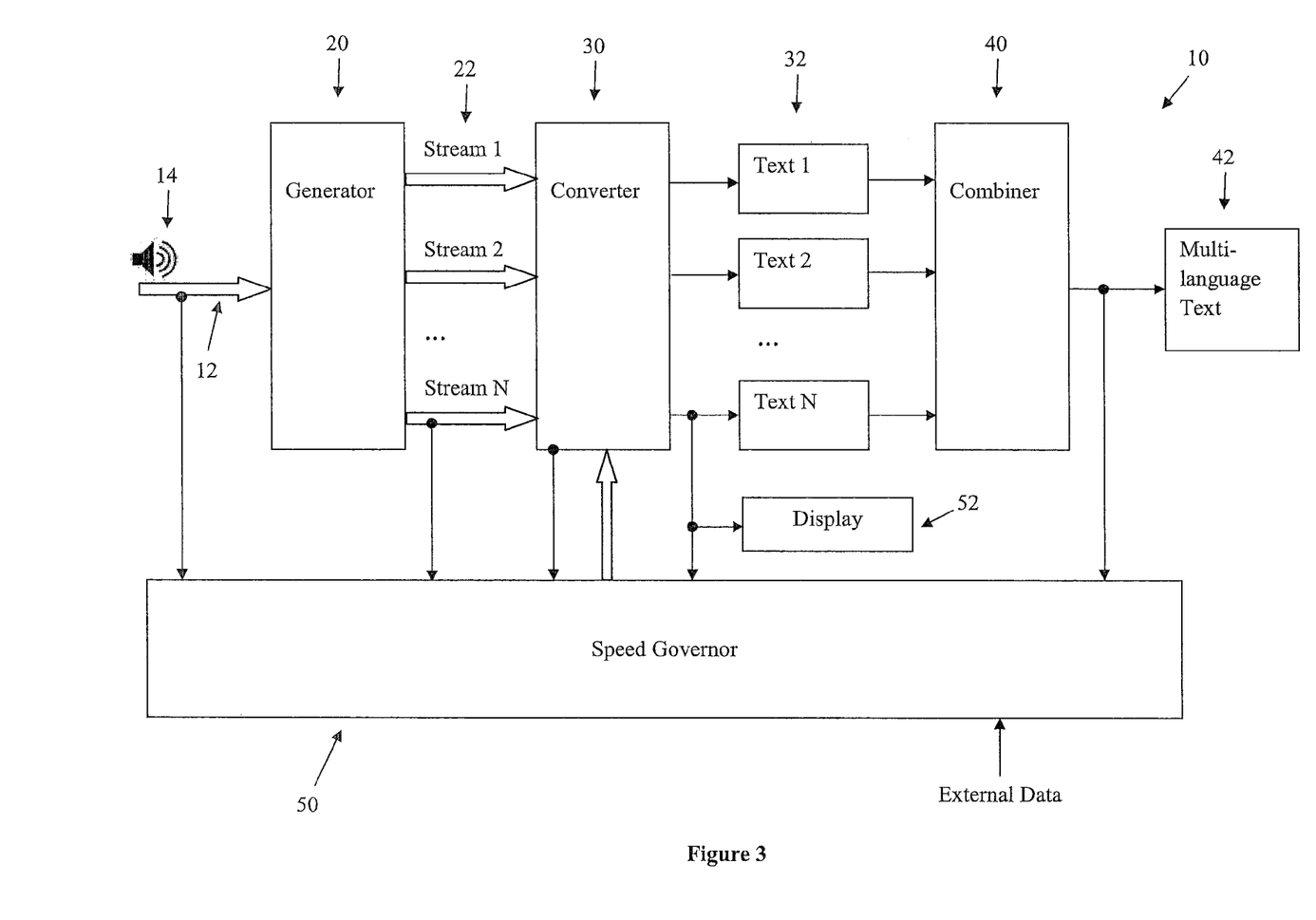
FIG. 3 is a schematic diagram of another example embodiment of the system with a speed governor in accordance with the present disclosure.

Referring to FIG. 3, in another example embodiment, the reporting system 10 further comprises a speed governor 50 for controlling the audio transcription process of the converter 30. Generally, the speed governor 50 enables a method of transcribing audio into text using a speech recognition system as follows.

The speed governor 50 monitors, estimates, or determines an input speed (e.g. words per minute) of audio 12 for transcription. The speed governor 50 further monitors at least one operating parameter of the speech recognition system included in the converter 30, and an output speed of a transcribed text 32. The at least one operating parameter is selected from those parameters that have an effect on the output speed of the transcribed text 32. Based on the collected information, the speed governor 50 adjusts the at least one operating parameter of the speech recognition system so that the transcribed text 32 is synchronized with audio 12 within a threshold delay defined in number of seconds or number of words.

In an example embodiment, speed governor 50 controls the transcription process so that the text 32 is output at an adjustable speed based on at least one of: the speed of the input audio 12, the speed of generated audio stream 22, the transcribing speed of the converter 30, the current speed of the text streams 32 and 42, the recognition quality of generated audio stream 22, the transcription accuracy of text streams 32 with respect to audio stream 22, and external data independent from audio 12.

For example, the speed governor 50 comprises means for measuring or estimating the speed of various audio or text streams in system 10 in terms of words per minute. In the example embodiment shown in FIG. 3, speeds are measured or estimated at least with respect to input audio 12, generated audio streams 22, and text streams 32 and 42. The speed governor 50 further comprises means for monitoring the processing speed of the converter 30 and operating parameters thereof, and means for adjusting the processing speed of the converter 30 and operating parameters thereof. This can be achieved by polling the converter 30 at selected times for obtaining its internal speed of transcription, or by requesting that the converter 30 reports to the speed governor 50 the data related to the transcription speed. A person skilled in the art would appreciate that the communication between converter 30 and speed governor 50 can be implemented using any suitable mechanism known in the art. For example, customized application programming interface (API) may be defined for the above purposes.

As a function of the measured or estimated speed of audio and/or text stream and the collected data in relation to the processing within the converter 30, the speed governor 50 enables sending a request or command to the converter 30 for adjusting its processing speed or operating parameters to output text streams 32 at respective target speed in terms of words per minute.

In some example embodiments, the target output speeds of the text streams are configurable and/or selectable from a pre-determined list of available speeds or from a range of possible speeds.

Preferably, the speeds for producing the text streams 32 are adjusted in real-time. This can be achieved by adjusting the operating parameters of the speech recognition engine of the converter 30. For example, decreasing the amount of accumulated audio before starting transcription may in turn reduce processing delay and improve real-time performance of the converter 30.

The control of the audio transcription process may further take into consideration the transcription accuracy of the speech recognition engine. Accordingly, in some example embodiments, the speed governor 50 is configurable to increase the speed of transcription when the transcription accuracy is high, and decrease the speed of transcription when the transcription accuracy is low.

Generally, the recognition quality of audio streams 22 would have an impact on how fast the audio streams 22 can be converted into text streams 32 and transcription accuracy. Recognition quality broadly refers to a collection of characteristics of an audio stream indicative of how easily can the audio be recognized by a speech recognition engine. For example, utterance with better clarity and optimal speed will usually take less time to transcribe with relatively high accuracy. On the other hand, unclear speech with inconsistent speed likely will cause significant transcription delay and low accuracy. As such, one way to enhance real-time capability of the reporting system 10 is to improve the recognition quality of audio streams 22 by using the method and the speed governor 50 described herein.

According to an example embodiment of the present disclosure, the speed governor 50 comprises means for displaying 52 in real-time each text stream 32 to the reporter generating the corresponding audio stream 22, so as to allow the reporter to compare the transcribed text stream 32 with the corresponding audio stream 22 thereby estimate or determine an accuracy rating of the transcribed text stream 32. Based on the estimated or determined transcription accuracy, the transcription speed of the converter 30 or the operating parameters thereof can be manually or automatically adjusted in real-time as discussed above.

Advantageously, the real-time displaying of transcribed text stream 32 allows a reporter to evaluate the recognition quality of the generated audio stream 22. Therefore, in some example embodiments, the speed governor 50 allows a reporter to conduct self-evaluation, self training, and/or real-time adjustment to improve the recognition quality of the generated audio streams 22.

According to an example embodiment of the present disclosure, the speed governor 50 comprises means for independently determining the transcription accuracy of text streams 32 without comparing with the generated audio streams 22. For example, the spelling, grammar, structure, context, or overall linguistic integrity of the text streams 32 can be analyzed to estimate or determine the transcription accuracy.

Preferably, the transcription speed control can be implemented by the converter 30 concurrently with the ongoing transcription without stopping or interrupting same.

Preferably, the speed governor 50 allows manual or automatic control of the processing speed or processing delay of the transcription engine of the converter 30. In manual mode, a reporter may issue speed control commands from a user interface in communication with the system 10, displaying all measured, estimated or collected data related to the current media paths and transcription process of the system. In automatic mode, the system 10 provides a programmable logic unit for analyzing the collected data and determining optimal or target speeds to be implemented by the converter 30.

Preferably, the determination of the desirable output speeds of the text streams takes into account the system capacity, current system load and/or resource availability of the converter 30. For example, alarm messages can be generated if converter 30 would not be able to satisfy the target transcription speeds or has become unavailable in part or in whole. To deal with such unavailability, in some example embodiments, system 10 further comprises backup or standby converter 30 to provide redundancy and high availability in computing resource, wherein the backup converter will be activated upon a determination that the original converter is out of service, so that the transcription process can continue without interruption even when there is software and/or hardware failure in the converter 30.

Still referring to FIG. 3, the control of output speeds of the text streams 32 may take into account external data. In some example embodiments, the system 10 is configurable to manually or automatically control the processing speed or processing delay of the transcription engine of the converter 30 so that the rate at which the text is generated is synchronized with the input audio 12 within a threshold defined in number of seconds or number of words. For example, the threshold may be configurable and selected based on data independent from audio 12.

To illustrate, if the transcription of a segment of audio 12 can be completed within a threshold delay period that is shorter than the time interval between the end of the segment of audio 12 and the start of the next segment of audio 12, then there can be a window of time available to stream supplemental text to the end users. The supplemental text will not be a part of the official transcript but may be used to provide the users further relevant information about the reported event, or to facilitate interactive multimedia exchange between the users. Supplemental text can also be commercial in nature and may include advertising messages or the like. Furthermore, the streaming of supplemental text may take place on a separate streaming channel or may share the same channel for streaming the transcription text.

In some example embodiments, a delay threshold is configurable as a function of supplemental text stream. Namely, based on an estimate of the available break between audio segments of audio 12, the delay threshold can be configured or selected in real-time to allow streaming of a supplemental text that will fit within the break period.

Preferably, the transcription speed control can be independently and dynamically applied on each audio stream 22 for outputting respective text stream 32. However, in some example embodiments, a speed control can be applied to one or more audio stream 22.

Figure 4:
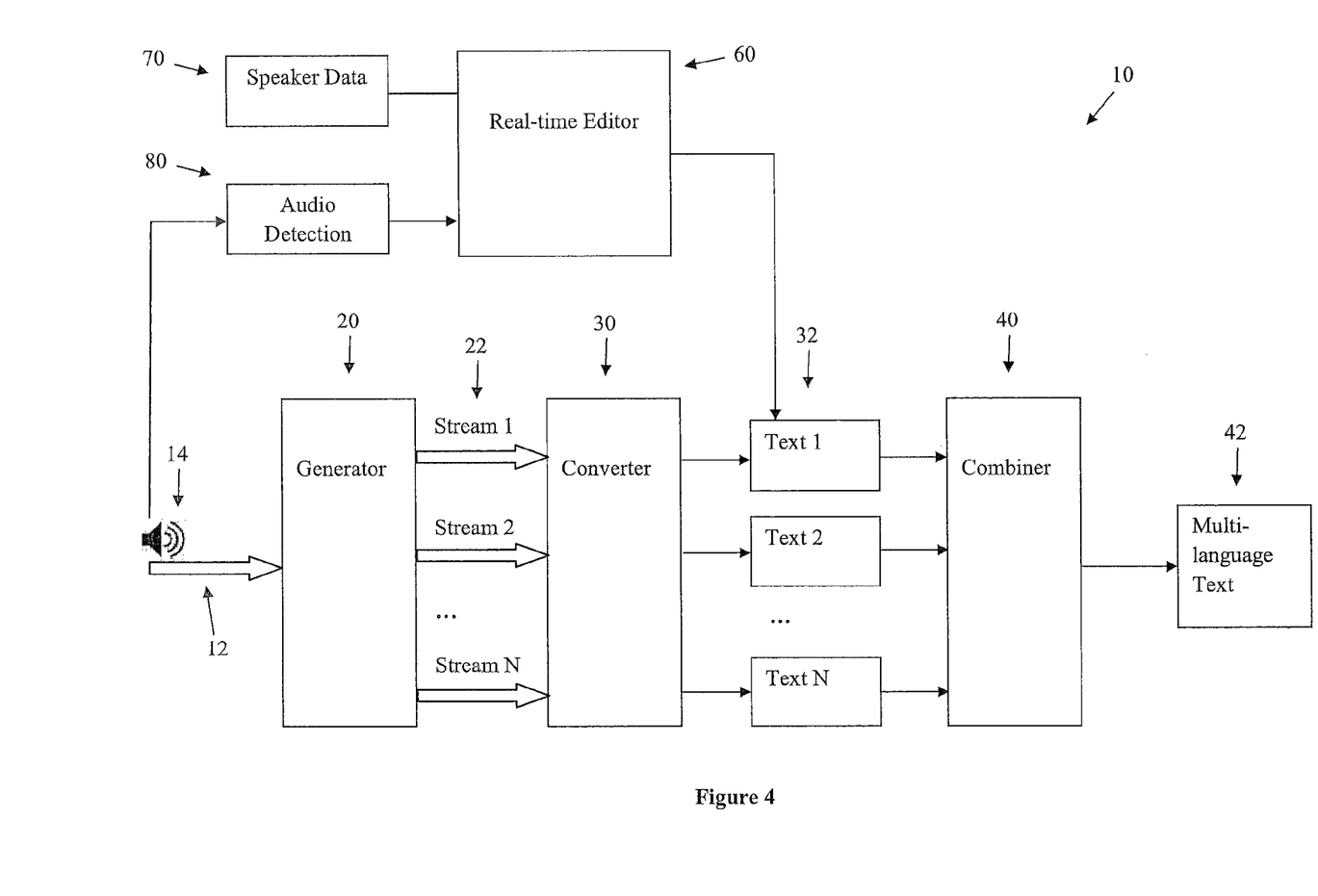
FIG. 4 is a schematic diagram of another example embodiment of the system with a real-time editor in accordance with the present disclosure.

Referring to FIG. 4, there is shown an example embodiment of the system 10, further comprising a real-time editor 60 for editing the transcribed text streams 32 in real-time based on data related to the audio source 14. Specifically, the system 10 comprises at least one computer processor and computer accessible memory, wherein the memory is accessible by the real-time editor 60. The system 10 comprises means or devices for inputting and storing information about a source 14 of audio 12 in the memory.

In an example embodiment, the information stored in memory about a source 14 of audio 12 comprises a location representation of the source 14 and an identity representation of the source 14. In the context of reporting the speech portion of an event, the source information may comprise speaker data 70, including speaker location, speaker identity, title, name, role, languages etc.

The system 10 further comprises means for associating the location representation of the source 14 with the identity representation of the source 14, using any suitable data structures implemented in software/hardware that is known in the art.

Upon detecting audio 12 from the source 14 by an audio detection means 80 of the system 10, the real-time editor 60 accesses the location representation of source 14, thereby causing the system 10 to incorporate at least a portion of the associated identity representation of source 14 into the transcribed text 32. In an example embodiment, the audio can be detected by the reporters through hearing the audio 12 and/or observation of speaker body language.

In an example embodiment, the location representation of the source 14 and/or the identity representation of the source 14 are accessible from a user interface on a display such as a touch screen or any suitable displaying device coupled to the system 10 or a processor thereof.

Figure 5:
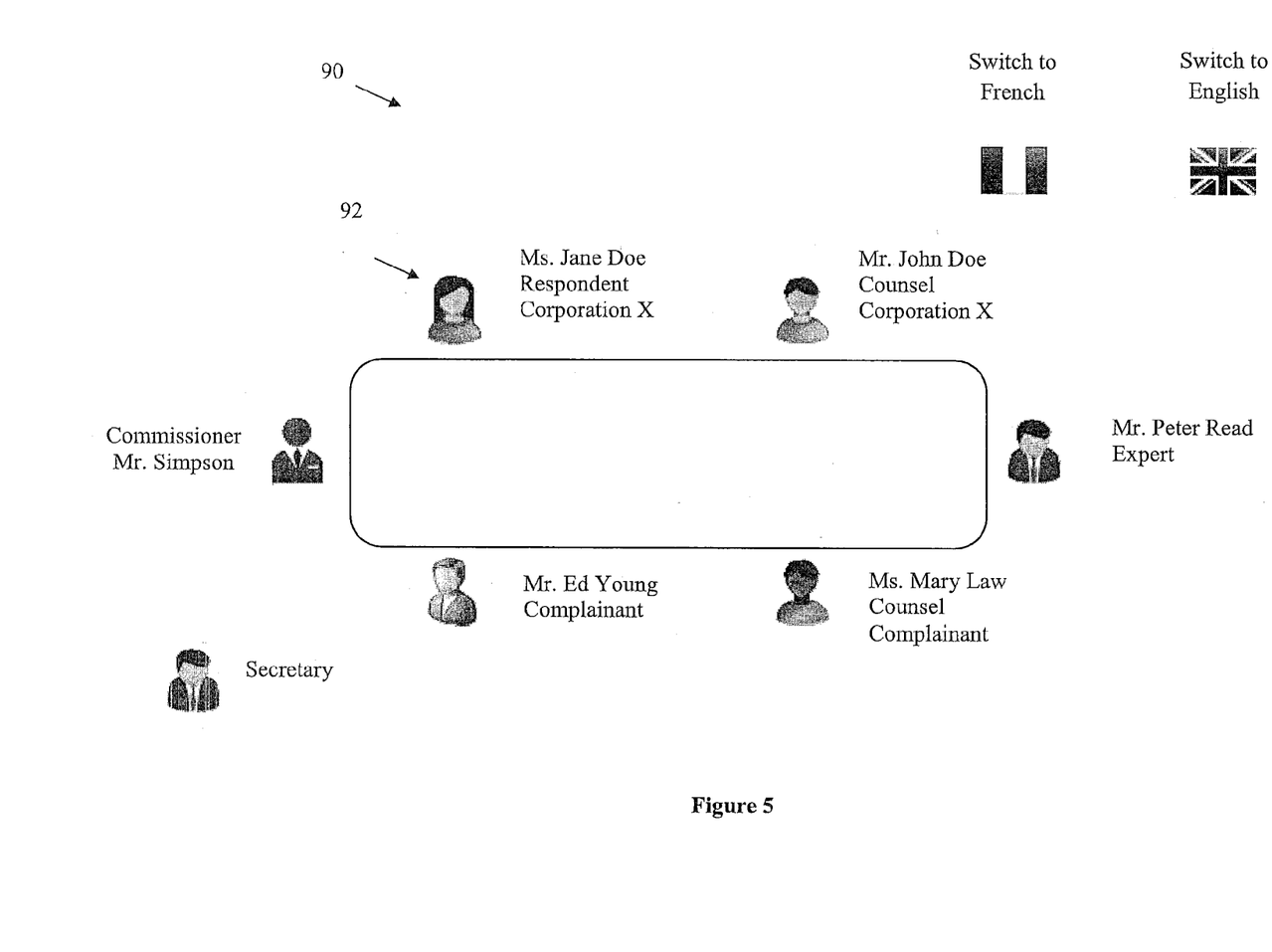
FIG. 5 is a graphical diagram of a partial user interface in accordance with an example embodiment of the system disclosed herein.

Referring to FIG. 5, a user interface 90 is shown in accordance with an example embodiment, displaying the location representation of the source 14 and the identity representation of the source 14.

In this example, source 14 of an administrative hearing event comprises up to 7 speakers with the following identity representation: the Commissioner of the administrative hearing Mr. Simpson, the secretary, complainant Mr. Ed Young and his counsel Ms. Mary Law, respondent Corporation X represented by Ms. Jane Doe and counsel for Corporation X Mr. John Doe, and an expert witness Mr. Peter Read. The location information of the speakers is graphically represented on the display as computer icons 92, wherein the displayed location representations form a graphical layout that substantially correspond with the positions of the speakers in the actual event setting.

According to an example embodiment, when speech is detected from a speaker, a reporter accesses the computer icon 92 representing the active speaker, by contacting the touch screen or clicking a mouse over the icon 92. This generates a signal to the real-time editor 60, which in turn accesses the location representation of source 14 stored in memory, retrieves the associated identity representation of source 14, and incorporate at least a portion of the associated identity representation of source 14 into the transcribed text 32, with any suitable modification or formatting thereof, which may comprise the time the audio 12 was detected.

As an example, at the beginning of the hearing depicted in FIG. 5, the commissioner may welcome the parties with "Good morning". Upon detecting the beginning of this utterance, a reporter accesses the computer icon representing the physical location of the commissioner at the hearing. As a result, the real-time editor 60 accesses the stored data representing the location of the commissioner, and obtains the stored data representing the identity of the commissioner. The real-time editor 60 may perform formatting on the identity representation if need be, to produce a text representation of the identity. For example, the real-time editor 60 may prefix the identity text with timestamp, and/or add punctuations as appropriate, as in: "@ 10:45:57 THE COMMISSIONER:". The real-time editor 60 then incorporates this formatted text into the transcription text stream 32. Subsequently, after the words of the active speaker are transcribed into the text streams 32, the content of relevant portion of text stream 32 will be: "@ 10:45:57 THE COMMISSIONER: Good morning".

Advantageously, the real-time editor provides a quicker, more accurate, more reliable and simpler way of incorporating speaker identity text into speech transcription comparing with the prior art systems.

In the prior art, the reporter usually takes notes of who spoke at what time, and subsequently add the speaker identities to the transcription based on the notes. With speech recognition systems, the reporter may speak the names of the active speakers to the recorder, thus relying on the speech recognition engine to convert the speaker identity into text. This is not only a slow and cumbersome practice, but also error prone when uncommon names, foreign names are encountered due to the reporter's unfamiliarity with those names and/or the inability of the speech recognition engine to correctly recognize those names. The problem becomes much worse when there are many speakers in the event, and/or when reporting in multiple languages simultaneously.

Using the real-time editor 60, the reporter need not to speak the names of the active speaker (this option is still available), and can handle large number of speakers with ease without the need to learn the proper pronunciation of their names. Rather, the reporters simply access the location representations of the speakers and the pre-stored identity representations automatically get incorporated into the speech transcription.

In some example embodiments, event-specific representations can be configured and pre-stored in memory for incorporation into the text stream 32 by the real-time editor 60. The event-specific representations are re-configurable or modifiable at any time.

Preferably, the event-specific representations are configured and pre-stored in memory in each of the reporting languages for real-time retrieval.

Using the above example, a heading can be programmed into memory for the commencement of the hearing in the form of "Upon commencing on" in different languages. When this representation is accessed through selection on a display or otherwise, the real-time editor 60 may format it with timestamp, and/or punctuations as appropriate, as in: "UPON COMMENCING ON Friday, May 11, 2012". Headings can be used in combination with speaker identity by sequentially accessing respective representation. For example, at the start of an examination on the expert witness by Ms. Law, the reporter may access a suitable heading representation followed by accessing the location representation of the examining counsel to incorporate into the transcript the following: "EXAMINATION ON QUALIFICATION BY MS. LAW".

In an example embodiment shown in FIG. 5, the user interface 90 further comprises representations for the reporting languages. In this example, a computer icon is provided for each of the reporting languages, namely English and French. When a speaker speaks in English, the reporter may access the "Switch to English" icon. The real-time editor 60 will then notify the reporting system 10 that subsequent audio segments of audio 12 are in English, until a switch to French or another language is triggered by accessing a different language representation icon. The system 10 and/or real-time editor 60 will perform any real-time editing of text stream 32 using the pre-stored text in the same language as that of the text stream 32.

In some example embodiments, the information about original or "floor" language is stored in memory and is associated with the corresponding segments, portions or blocks in input audio 12, and/or generated audio streams 22 and/or transcribed text streams 32, thereby enables the combiner 40 to simultaneously generate the combined multi-language text stream 42 in real-time.

Therefore, the real-time editor 60 provides the advantage that when simultaneously reporting in multiple languages, only one reporter is required on-site while other members of the reporting team can be off-site voice writing, transcribing and reporting remotely at any location.

The reporting system 10 can be used in any setting involving live speech and/or multimedia event reporting, including legal/administrative proceedings, public hearings, health and educational institutions, and any other situations where official text record of an event is desirable or required.

In some example embodiments, the reporting system 10 comprises storage and networking means to facilitate the reporting process described herein. All media input, streams, recorded multimedia files and transcriptions are stored and accessible in real-time or on-demand in any form. For example, the system 10 may comprise local or remote serves or any suitable means for real-time streaming of any or all multimedia files and transcriptions including multiple, simultaneous language-associated streams so that users can access the media and transcription of media in real-time in desired language anywhere in the world.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

In some embodiments, the present invention comprises a data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the system to become coupled to other data processing systems or remote printers or storage devices through intervening private or public networks. Modems, cable modem and Ethernet cards are just a few of the currently available types of network adapters.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

What is claimed is:

1. A method for reporting a sequence of audio from one or more speakers of an event, said sequence of audio comprising words spoken in a plurality of languages, comprising the steps of:
    (a) providing a computer-implemented user interface;
    (b) for each speaker at said event, storing a location representation of said each speaker and an associated identity representation of said each speaker in a non-transitory computer accessible storage medium;
    (c) providing a processor programmed to display each said location representation on said computer-implemented user interface to form a graphical layout substantially corresponding with a positional arrangement of said each speaker during said event;
    (d) receiving said sequence of audio, wherein upon detecting, by a person reporting said event, an utterance from an active speaker of said event, accessing, by said person, said displayed location representation of said active speaker via said computer-implemented user interface thereby causing said processor to retrieve said identity representation of said active speaker;
    (e) substantially simultaneous with receiving said sequence of audio, using a voice recording device to generate a corresponding audio stream in each of said plurality of languages;
    (f) converting, by a speech transcription device, each of said generated audio streams into a text stream in its respective language;
    (g) incorporating, with said processor, said retrieved identity representation into said converted text streams to provide speaker identification thereto; and
    (h) substantially simultaneous with converting said generated audio streams, selectively combining, with said processor, said converted text streams into a combined multi-language text stream representing said sequence of audio in said plurality of languages, thereby producing a real-time multi-language transcription of said event transcribed only in respective languages in which said spoken words were uttered;
    wherein step (f) further comprises the steps of:
    (f1) monitoring, by a computer-implemented speed governor, an input speed of said generated audio streams, at least one operating parameter of said speech transcription device, and an output speed of said converted text streams, said at least one operating parameter affecting said output speed of said converted text streams; and
    (f2) adjusting, via said computer-implemented speed governor, said at least one operating parameter of said speech transcription device so that said converted text streams are synchronized with said generated audio streams within a threshold delay defined in a number of seconds or a number of words.

2. The method of claim 1 wherein step (f2) takes into account at least one of a recognition quality of said generated audio streams, a transcription accuracy of said converted text streams, and an external data independent from said generated audio streams.

3. A system for reporting a sequence of audio from one or more speakers of an event, said sequence of audio comprising words spoken in a plurality of languages, the system comprising:
    a voice recording device for generating, in each of said plurality of languages, an audio stream corresponding to said sequence of audio;
    a speech transcription device for converting each of said generated audio streams into a text stream in its respective language;
    a real-time editor for formatting said converted text streams, comprising:
        a computer-implemented user interface;
        a non-transitory computer accessible storage medium for storing a location representation of each speaker at said event and an associated identity representation of said each speaker; and
        a processor programmed to display each said location representation on said computer-implemented user interface to form a graphical layout substantially corresponding with a positional arrangement of said each speaker during said event, to retrieve said associated identity representation upon detecting an access, by a person reporting said event, to said displayed location representation via said computer-implemented user interface, and to cause said retrieved identity representation to be incorporated into said converted text streams to provide speaker identification thereto; and
    a computer program, which upon execution by a computer, causes the computer to selectively combine said converted text streams into a combined multi-language text stream representing said sequence of audio in said plurality of languages, thereby producing a real-time multi-language transcription of said event transcribed only in respective languages in which said spoken words were uttered; wherein said computer program comprises a computer-implemented speed governor for monitoring an input speed of said generated audio streams, at least one operating parameter of said speech transcription device, and an output speed of said converted text streams, said at least one operating parameter affecting said output speed of said converted text streams, and for adjusting said at least one operating parameter of said speech transcription device so that said converted text streams are synchronized with said generated audio streams within a threshold delay defined in a number of seconds or a number of words.

4. A non-transitory computer readable memory having recorded thereon statements and instructions for execution by a computer for reporting a sequence of audio from one or more speakers at an event, said sequence of audio comprising words spoken in a plurality of languages, said statements and instructions comprising:
    a computer code, which upon execution by the computer, causes the computer to communicate with a voice recording device for generating, in each of said plurality of languages, an audio stream corresponding to said sequence of audio;
    a computer code, which upon execution by the computer, causes the computer to communicate with a speech transcription device for converting each of said generated audio streams into a text stream;
    a computer code, which upon execution by the computer, causes the computer to provide a user interface, to store a location representation of each speaker at said event and an associated identity representation of said each speaker in non-transitory computer accessible storage medium, to display each said location representation on said user interface to form a graphical layout substantially corresponding with a positional arrangement of said each speaker during said event, to retrieve said associated identity representation upon detecting an access, by a person reporting said event, to said displayed location representation via said user interface, and to incorporate said retrieved identity representation into said converted text streams to provide speaker identification thereto; and a computer code, which upon execution by the computer, causes the computer to selectively combine said converted text streams into a combined multi-language text stream representing said sequence of audio in said plurality of languages, thereby producing a real-time multi-language transcription of said event transcribed only in respective languages in which said spoken words were uttered, to monitor an input speed of said generated audio streams, at least one operating parameter of said speech transcription device, and an output speed of said converted text streams, said at least one operating parameter affecting said output speed of said converted text streams, and to adjust said at least one operating parameter of said speech transcription device so that said converted text streams are synchronized with said generated audio streams within a threshold delay defined in a number of seconds or a number of words.

* * * * *